(12) United States Patent
Nonaka

(10) Patent No.: US 7,676,083 B2
(45) Date of Patent: Mar. 9, 2010

(54) MOVING IMAGE CONVERSION DEVICE, METHOD AND PROGRAM, MOVING IMAGE DISTRIBUTION DEVICE, AND E-MAIL RELAY DEVICE

(75) Inventor: Shunichiro Nonaka, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1413 days.

(21) Appl. No.: 10/975,426

(22) Filed: Oct. 29, 2004

(65) Prior Publication Data

US 2005/0093981 A1 May 5, 2005

(30) Foreign Application Priority Data

Oct. 29, 2003 (JP) .............................. 2003-368614

(51) Int. Cl.
- G06K 9/00 (2006.01)
- G06K 15/00 (2006.01)
- H04N 1/405 (2006.01)
- G09G 5/00 (2006.01)

(52) U.S. Cl. ...................... 382/167; 382/252; 358/3.03; 345/616

(58) Field of Classification Search ................ 382/167, 382/163, 166, 164, 251, 252, 253, 307, 325; 358/3.03–3.05; 345/616
See application file for complete search history.

(56) References Cited

U.S. PATENT DOCUMENTS

| | | | | |
|---|---|---|---|---|
| 5,450,098 A * | 9/1995 | Oz | ............................. | 345/605 |
| 5,844,699 A * | 12/1998 | Usami et al. | ................. | 358/518 |
| 5,940,541 A * | 8/1999 | Donelly | ....................... | 382/252 |
| 6,775,705 B2 * | 8/2004 | Maeda | ......................... | 709/230 |
| 7,051,040 B2 * | 5/2006 | Easwar | ...................... | 707/102 |
| 7,076,112 B2 * | 7/2006 | Crabtree | ..................... | 382/254 |
| 2002/0051181 A1* | 5/2002 | Nishimura | ................. | 358/1.15 |
| 2003/0021470 A1* | 1/2003 | Kakutani | .................... | 382/162 |
| 2003/0103669 A1* | 6/2003 | Bucher | ....................... | 382/162 |
| 2004/0062437 A1* | 4/2004 | Luo et al. | ................... | 382/166 |
| 2004/0105119 A1 | 6/2004 | Nonaka | | |
| 2004/0184658 A1* | 9/2004 | Inoue | ........................ | 382/162 |

FOREIGN PATENT DOCUMENTS

| EP | 1182639 A2 * | 2/2002 |
|---|---|---|
| EP | 1696384 A1 * | 8/2006 |
| JP | 6-118920 A | 4/1994 |

(Continued)

OTHER PUBLICATIONS

Paul Heckbert, Color image Quantization for Frame Buffer Display,Jul. 1982, Computer Graphics, vol. 16 No. 3, 297-307.*

(Continued)

*Primary Examiner*—Aaron W Carter
(74) *Attorney, Agent, or Firm*—Birch, Stewart, Kolasch & Birch, LLP

(57) ABSTRACT

A matrix of processing object frame data and a matrix of temporally consecutive next frame data of the processing object frame data, are prepared as matrices for error diffusion processing. An error generated at a pixel position in a frame, which is represented by the processing object frame data, is diffused to a corresponding pixel in a frame represented by the temporally consecutive next frame data of the processing object frame data.

11 Claims, 14 Drawing Sheets

FOREIGN PATENT DOCUMENTS

| | | |
|---|---|---|
| JP | 7-288833 A | 10/1995 |
| JP | 11-259640 A | 9/1999 |
| JP | 2001-217860 A | 8/2001 |
| JP | 2003-76638 A | 3/2003 |
| WO | WO02065755 A1 * | 8/2002 |

OTHER PUBLICATIONS

Multiple-image Network Graphics Ed. Greg Roelofs. Sep. 6, 2007 <http://www.libpng.org/pub/mng/>. 4 pages.*

Paul Heckbert, "Color image Quantization for Frame Buffer Display", Jul. 1982, Computer Graphics, vol. 16 No. 3, 297-307.*

Han et al., "Universal Tuner: A Video Streaming System for CPU/Power-Constrained Mobile Devices", Sep. 30-Oct. 5, 2001, ACM, pp. 632-633.*

* cited by examiner

| MODEL TYPE | WHETHER MOVING IMAGE CAN BE DISPLAYED | IMAGE SIZE | NUMBER OF COLORS, WHICH CAN BE DISPLAYED | NUMBER OF FRAMES OF COLOR REDUCTION MOVING IMAGE |
|---|---|---|---|---|
| A001 | × | 120x130 | 4096 | 5 |
| A002 | ○ | 120x130 | 65536 | 10 |
| B001 | ○ | 176x164 | 262144 | 12 |
| B002 | ○ | 132x142 | 262144 | 12 |
| C001 | × | 120x130 | 65536 | 5 |
| C002 | ○ | 132x160 | 262144 | 10 |
| C003 | ○ | 132x136 | 65536 | 10 |
| D001 | × | 160x198 | 65536 | 7 |
| D002 | × | 128x128 | 65536 | 7 |

FIG.2

MOVING IMAGE CONVERSION DEVICE, METHOD AND PROGRAM, MOVING IMAGE DISTRIBUTION DEVICE, AND E-MAIL RELAY DEVICE

BACKGROUND OF THE INVENTION

1. Field of the Invention

The present invention relates to a moving image conversion device and its method for converting a moving image into a color reduction moving image, a moving image distribution device for distributing a moving image to a mobile terminal device or the like, an e-mail relay device for relaying an e-mail, to which a moving image is attached, and sending the e-mail to a transmission destination, and a program for causing a computer to execute the moving image conversion method.

2. Description of the Related Art

Images obtained with digital cameras, scanners or the like can be represented in 8-bit colors for each of the RGB colors, which are 24-bit colors in total. In other words, the images can be represented in approximately 16.77 million colors. However, some image reproduction devices can reproduce a smaller number of colors (for example, 256 colors). Further, image formats such as gif (Graphic Interchange Format) and png (Portable Network Graphic), which are frequently used in websites, can process only 256 colors. Therefore, when the images, which were obtained with the digital cameras or the like, are displayed at the reproduction devices, which can reproduce a smaller number of colors, or the images are converted to image formats such as gif and png, color reduction processing is required to reduce the number of colors from 16.77 million to 256.

Conventionally, the color reduction processing as described above is performed by generating palette data representing palette colors of 256 colors, which are optimal colors for representing a color reduction processing object image in 256 colors. A color, into which the color of each pixel should be converted, is selected from the palette colors represented by the palette data, and color reduction processing is performed on each pixel.

Further, a method is proposed, wherein when moving images are obtained with digital video cameras, color reduction processing is performed on the moving images in real time, and images with movement (hereinafter called color reduction moving images) are produced by displaying still images consecutively in switching them (Japanese Unexamined Patent Publication No. 11(1999)-259640). In this method, the color reduction processing is performed by generating palette data for every few frames instead of each frame. A single set of palette data is used to perform color reduction processing on every few frames so that the color reduction processing is performed in real time without dropping any frames included in the moving image, which change every 1/60 second.

Here, in some cases, gradations in images are lost when color reduction processing is performed on the images. For example, if the palette data does not include orange, but includes only red and yellow, an orange area in an original image, which is represented by original image data before color reduction processing, can be represented only in red or yellow. Therefore, the orange area in the original image cannot be reproduced as an orange area in a color reduction moving image.

Therefore, color reduction processing is performed on the orange area using error diffusion processing. In the error diffusion processing, red pixels and yellow pixels are produced in the area in appropriate ratios to each other. Accordingly, although when each pixel is seen, the color of the pixel is red or yellow, when the area is seen as a whole, the color of the area is pseudo-orange.

The color reduction processing using error diffusion processing will be described below. FIGS. 19A and 19B are diagrams for explaining the color reduction processing using error diffusion processing. FIG. 19A illustrates the arrangement of pixels in an original image, which is represented by original data. FIG. 19B illustrates the arrangement of pixels in a processed image, which is represented by processed data, on which error diffusion processing has been performed. Here, to simplify the explanation, it is assumed that the original image includes 5×3 pixels, and the position of each pixel is represented by using (x, y) coordinates. It is also assumed that the pixel (1, 1) at the upper left corner is a start point in FIG. 19A, and the color reduction processing is performed by performing error diffusion processing in the x direction and moving a pixel string, on which error diffusion processing is performed, in the y direction at the same time. It is also assumed that the palette data includes only four values of 10, 20, 30 and 40.

FIG. 20 illustrates an example of a matrix for error diffusion processing. As illustrated in FIG. 20, a matrix T0 for error diffusion processing is used to diffuse an error generated at a pixel (namely, a pixel corresponding to the center of the matrix, called P0), which is a color reduction processing object, to four neighboring pixels at the right side, the lower right side, the lower side and the lower left side of the pixel P0 in the ratios of 7/16, 3/16, 5/16, and 1/16, respectively. Since error diffusion processing has been already performed on neighboring pixels at the upper left side, the upper side, the upper right side and the left side of the pixel P0, the elements at the upper left side, the upper side, the upper right side and the left side of the element at the center of the matrix T0 do not have any values.

In the original data as illustrated in FIG. 19A, the pixel value of the pixel (1, 1) is 24. Therefore, the pixel value of the pixel (1, 1) is changed to 20, which is the closest value to 24 among the values included in the palette data. Accordingly, an error of 4 is generated at the pixel (1, 1), and the error of 4 is diffused to pixels (2, 1), (2, 2), and (1, 2) in the ratios of 7/16, 3/16, and 5/16, respectively. Next, color reduction processing is performed on the pixel (2, 1). In the original data, the pixel value of the pixel (2, 1) was 24. However, since a value of 7×4/16 has been added to 24 in the error diffusion processing performed on the pixel (1, 1), the pixel value of the pixel (2, 1) is 25.75. Therefore, the pixel value of the pixel (2, 1) is changed to 30, which is the closest value to 25.75 among the values included in the palette data. Accordingly, an error of −4.25 is generated at the pixel (2, 1), and the error of −4.25 is diffused to pixels (3, 1), (3, 2), (2, 2), and (1, 2) in the ratios of 7/16, 3/16, 5/16, and 1/16, respectively. Then, color reduction processing using error diffusion processing is sequentially performed on all of the pixels, and processed data can be obtained.

Here, each of the pixels in the original image has a pixel value of 23 to 27, but each of the pixels in the processed image has a pixel value of 20 or 30. However, the pixels having the pixel value of 20 and the pixels having the pixel value of 30 are produced in appropriate ratios to each other. Therefore, although there is no pixel, which has a pixel value between 20 and 30, in the processed image, pseudo gradations in the range of pixel values between 23 and 27 in the original data can be reproduced.

Meanwhile, functions of mobile terminal devices such as cellular camera phones are rapidly improving, and communication speeds thereof are improving. Therefore, mobile terminal devices have been proposed, which can capture moving images and send the captured moving images by attaching them to e-mails, or access moving image distribution servers, which distribute moving image contents, and download and reproduce desired moving image contents.

Further, although functions are limited to still images, an e-mail relay device has been proposed, which can perform appropriate image processing on images attached to e-mails, which were sent from a mobile terminal device with a camera, based on the model type of a terminal device at a destination, (U.S. Patent Laid-Open No. 20040105119). By using the e-mail relay device as described above, image processing may be performed on image data so that an image is produced, which is appropriate for an image size, the brightness of a display, a color tone, or the like of the mobile terminal device at the destination, and an e-mail, to which the image is attached, can be sent.

The color reduction moving images may be produced from the moving images by the method disclosed in Japanese Unexamined Patent Publication No. 11(1999)-259640. However, there is demand for production of high quality color reduction moving images by using the characteristics of the moving images.

SUMMARY OF THE INVENTION

In view of the foregoing circumstances, it is an object of the present invention to make it possible to produce higher quality color reduction moving images from moving images.

A moving image conversion device according to the present invention is a moving image conversion device for converting a moving image having a plurality of frames into a color reduction moving image including a predetermined number of colors, the device comprising:

a frame sampling means for sampling a plurality of frames for color reduction moving image production, which is used to produce the color reduction moving image, from the plurality of frames in the moving image;

a palette data generation means for generating palette data to produce the color reduction moving image;

a color reduction processing means for converting each of the plurality of frames for color reduction moving image production into a color reduction moving image frame by color reduction processing using error diffusion processing, wherein the error diffusion processing is performed with reference to the palette data and an error between the palette data and actual data, which is generated at each pixel position in each of the plurality of frames for color reduction moving image production, is diffused to a corresponding pixel position or a neighboring pixel position of the corresponding pixel position, which includes the corresponding pixel position, in the temporally consecutive next frame for color reduction moving image production, of each of the plurality of frames for color reduction moving image production; and a frame combination means for combining the color reduction moving image frame to produce the color reduction moving image.

In the moving image conversion device according to the present invention, the color reduction processing means may increase the degree of diffusing the error to the corresponding pixel position in the temporally consecutive next frame for color reduction moving image production, when the number of the plurality of frames for color reduction moving image production per unit time is larger.

A moving image distribution device according to the present invention is a moving image distribution device for sending a requested moving image to a transmission request terminal device, which has requested transmission of the moving image, the device comprising:

a model type distinguishing means for distinguishing the model type of the transmission request terminal device; and the moving image conversion device according to the present invention, wherein when the model type of the transmission request terminal device is a model type, which cannot display the moving image but can display a color reduction moving image, the requested moving image is converted to the color reduction moving image, and the color reduction moving image is sent to the transmission request terminal device instead of the moving image.

A e-mail relay device according to the present invention is a e-mail relay device for sending an e-mail, to which a moving image is attached, to a transmission destination terminal device, which is a transmission destination of the e-mail, the device comprising:

a model type distinguishing means for distinguishing the model type of the transmission destination terminal device; and the moving image conversion device according to the present invention, wherein when the model type of the transmission destination terminal device is a model type, which cannot display the moving image but can display a color reduction moving image, the moving image, which is attached to the e-mail, is converted to the color reduction moving image, and the color reduction moving image is sent to the transmission destination terminal device instead of the moving image.

A moving image conversion method according to the present invention is a moving image conversion method for converting a moving image having a plurality of frames into a color reduction moving image including a predetermined number of colors, the method comprising the steps of:

sampling a plurality of frames for color reduction moving image production, which is used to produce the color reduction moving image, from the plurality of frames in the moving image;

generating palette data to produce the color reduction moving image;

converting each of the plurality of frames for color reduction moving image production into a color reduction moving image frame by color reduction processing using error diffusion processing, wherein the error diffusion processing is performed with reference to the palette data and an error between the palette data and actual data, which is generated at each pixel position in each of the plurality of frames for color reduction moving image production, is diffused to a corresponding pixel position or a neighboring pixel position of the corresponding pixel position, which includes the corresponding pixel position, in the temporally consecutive next frame for color reduction moving image production, of each of the plurality of frames for color reduction moving image production; and combining the color reduction moving image frame to produce the color reduction moving image.

Further, a program for causing a computer execute the moving image conversion method according to the present invention may be provided.

According to the moving image conversion device and method of the present invention, a plurality of frames for color reduction moving image production is sampled from a plurality of frames of moving images to produce color reduction moving images, and palette data for producing the color reduction moving images are generated. Then, each of the plurality of frames for color reduction moving image production is converted to a color reduction moving image frame by performing color reduction processing using error diffusion processing. The error diffusion processing is performed with reference to the palette data. In the error diffusion processing, an error between actual data and the palette data, which is generated at each pixel position in each of the plurality of frames for color reduction moving image production, is diffused to a corresponding pixel position in the temporally consecutive frame for color reduction moving image production, of each of the plurality of frames for color reduction moving image production. Alternatively, the error is diffused to the neighboring pixel position of the corresponding pixel position, which includes the corresponding pixel position, in the temporally consecutive frame for color reduction moving image production, of each of the plurality of frames for color reduction moving image production. Further, the color reduction moving image frames are combined, and a color reduction moving image is produced.

Here, the color reduction moving image has a plurality of color reduction moving image frames, and the color reduction moving image has a characteristic similar to moving images, that a corresponding pixel in each of the frames of color reduction moving images closely correlates with each other. Therefore, when error diffusion processing is performed, an error, which is generated at each pixel in a frame for color reduction moving image production, is diffused to a corresponding pixel position or a neighboring pixel position of the corresponding pixel position, which includes the corresponding pixel position, in the temporally consecutive frame for color reduction moving image production. Accordingly, color reduction processing can be performed so that when a color reduction moving image is reproduced, the discontinuity in colors between frames is reduced. Therefore, the continuity in colors between frames is improved, and a higher quality color reduction moving image can be produced in comparison with the case of performing error diffusion processing only within a frame.

If a time interval between the frames for color reduction moving image production to produce the color reduction moving image is shorter, corresponding pixels in the frames correlate with each other more closely. Therefore, if the number of frames for color reduction moving image production per unit time is larger, the degree of diffusing an error to the corresponding pixel position in the temporally consecutive frame for color reduction moving image production is increased. Accordingly, the continuity in colors between the frames can be improved, and an even higher quality color reduction moving image can be produced.

According to a moving image distribution device of the present invention, if the model type of a transmission request terminal device, which has requested transmission of a moving image, is distinguished, and the transmission request terminal device cannot display a moving image, but can display a color reduction moving image, the moving image is converted to the color reduction moving image in the same manner as the processing by the moving image conversion device according to the present invention. Then, the color reduction moving image is sent to the transmission request terminal device instead of the moving image. Therefore, even if the terminal device, which has requested transmission of the moving image, cannot display the moving image, a high quality pseudo moving image can be displayed at the terminal device by using the color reduction moving image.

According to an e-mail relay device of the present invention, if the model type of a destination terminal device of an e-mail, to which a moving image is attached, is distinguished, and the destination terminal device cannot display a moving image, but can display a color reduction moving image, the moving image is converted to the color reduction moving image in the same manner as the processing by the moving image conversion device according to the present invention. Then, the color reduction moving image is sent to the destination terminal device instead of the moving image. Therefore, even if the destination terminal device cannot display the moving image, a high quality pseudo moving image can be displayed at the destination terminal device by using the color reduction moving image attached to the e-mail.

Note that the program of the present invention may be provided being recorded on a computer readable medium. Those who are skilled in the art would know that computer readable media are not limited to any specific type of device, and include, but are not limited to: floppy disks, CD's RAM'S, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

BRIEF DESCRIPTION OF THE DRAWINGS

FIG. 2 is a table illustrating the relationship between model types and formats;

DESCRIPTION OF THE PREFERRED EMBODIMENTS

Figure 1:
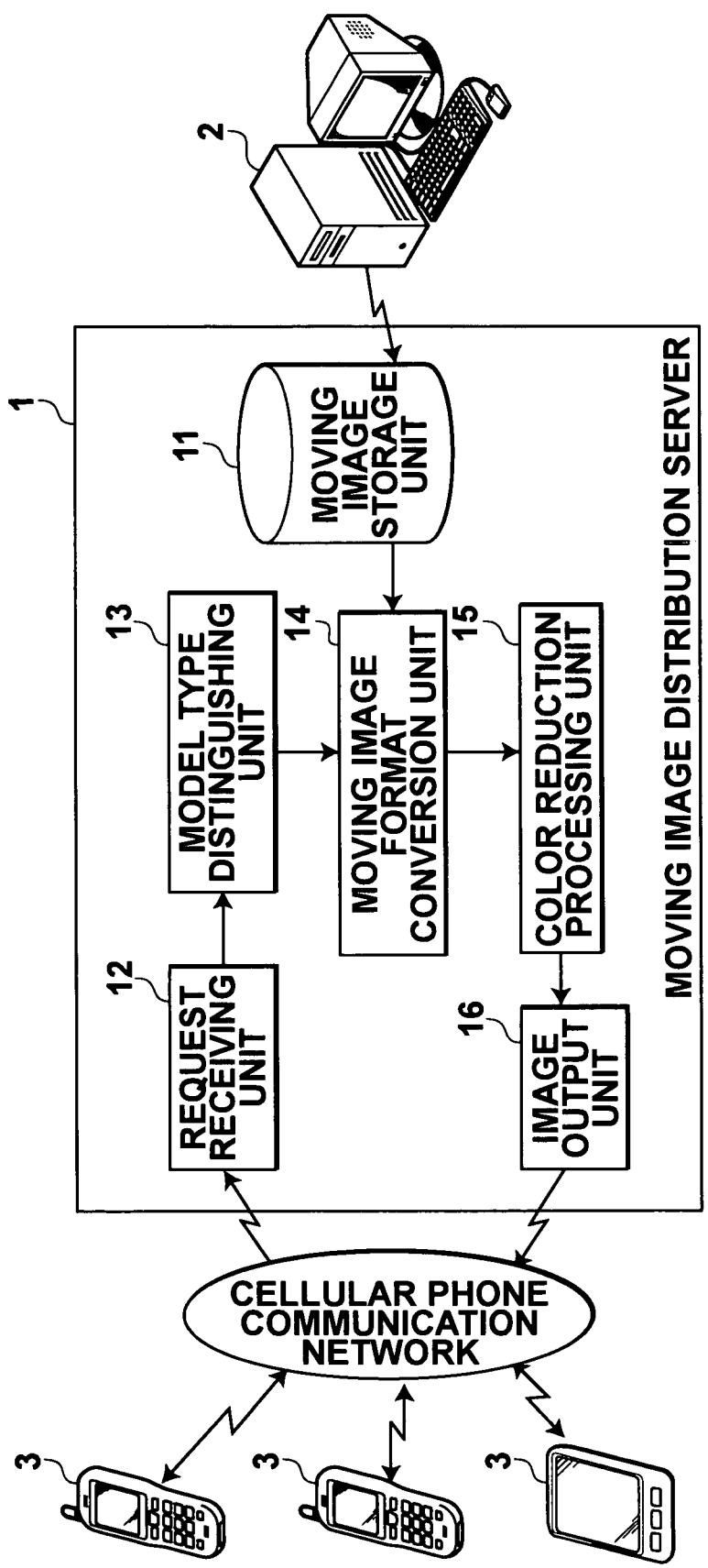
FIG. 1 is a schematic block diagram illustrating the configuration of a moving image distribution system, to which a moving image conversion device and a moving image distribution device according to a first embodiment of the present invention are applied.

Hereinafter, embodiments of the present invention will be described with reference to the attached drawings. FIG. 1 is a schematic block diagram illustrating the configuration of a moving image distribution system, to which a moving image conversion device and a moving image distribution device according to a first embodiment of the present invention are applied. As illustrated in FIG. 1, the moving image distribution system according to the first embodiment of the present invention includes a moving image distribution server 1. Moving image data M0, which are generated at a personal computer 2 or the like, which is a moving image content producing device, are stored in the moving image distribution server 1. Then, a mobile terminal device 3 such as a cellular phone, PHS (Personal Handy-Phone System), and PDA (Personal Digital Assistant) sends a moving image distribution request to the moving image distribution server 1 via a cellular phone communication network. Accordingly, the moving image distribution server 1 distributes the moving image data M0 to the mobile terminal device 3.

As illustrated in FIG. 1, the moving image distribution server 1 includes a moving image storage unit 11, a request receiving unit 12, a model type distinguishing unit 13, a moving image format conversion unit 14, a color reduction processing unit 15, and an image output unit 16.

The moving image storage unit 11 stores a plurality of sets of moving image data M0, which are generated by the personal computer 2. The moving image data M0 are encoded in a predetermined compression format and stored in the moving image storage unit 11.

The request receiving unit 12 receives a moving image distribution request, which is sent from the mobile terminal device 3. The moving image distribution request, which is sent from the mobile terminal device 3, includes a file name of the requested moving image data M0 and model type information indicating the model type of the mobile terminal device 3.

The model type distinguishing unit 13 distinguishes the model type of the mobile terminal device 3 based on the model type information included in the request.

The moving image format conversion unit 14 reads out the moving image data M0, of which the file name is included in the request, from the moving image storage unit 11. Further, the moving image format conversion unit 14 decodes the moving image data M0, and converts the format of the read-out moving image data M0 based on the model type of the mobile terminal device 3, which was distinguished by the model type distinguishing unit 13. At this time, the moving image format conversion unit 14 converts the format of the moving image data M0 with reference to a table showing the relationship between model types and formats.

FIG. 2 is a table illustrating the relationship between model types and formats. As illustrated in FIG. 2, if the mobile terminal device 3 is a cellular phone, a table L1 shows whether the cellular phone can display moving images, a display size of the cellular phone, the number of colors, which can be displayed at the cellular phone, and the number of color reduction moving image frames, which can be displayed at the cellular phone, for each model type of cellular phone. Then, the moving image format conversion unit 14 refers to the table L1 and converts the format of the moving image data M0 into a format, which is appropriate for the display size of the mobile terminal device 3 and the number of colors, which can be displayed at the mobile terminal device 3 based on the model type of the mobile terminal device 3, which has sent the request. Accordingly, moving image data M1, of which format has been converted, is generated. Further, the moving image data M1 is encoded.

Figure 3:
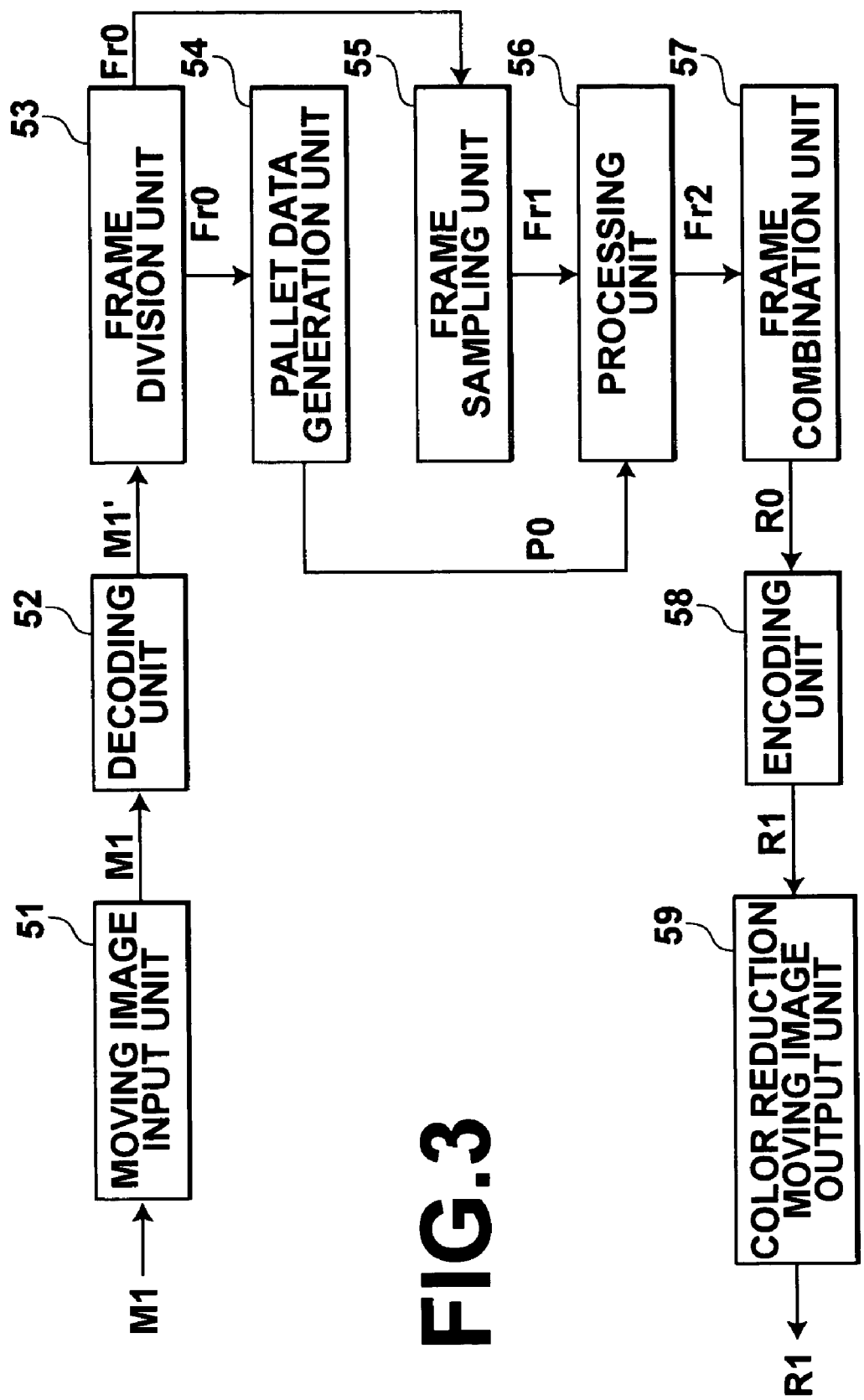
FIG. 3 is a schematic block diagram illustrating the configuration of a color reduction processing unit in detail.

If the mobile terminal device 3, which has sent the request, cannot display moving images, the color reduction processing unit 15 converts the moving image data M1, of which format has been converted, into color reduction moving image data R1. FIG. 3 is a schematic block diagram illustrating the configuration of the color reduction processing unit 15. As illustrated in FIG. 3, the color reduction processing unit 15 includes a moving image input unit 51, a decoding unit 52, a frame division unit 53, a palette data generation unit 54, a frame sampling unit 55, a processing unit 56, a frame combination unit 57, an encoding unit 58, and a color reduction moving image output unit 59.

The moving image input unit 51 receives an input of the moving image data M1, of which format has been converted, to the color reduction processing unit 15.

The decoding unit 52 decodes the encoded moving image data M1, and generates raw moving image data M1'.

The frame division unit 53 divides the raw moving image data M1' into image data for each frame (hereinafter called frame data Fr0). In the present embodiment, a single frame represents a moving image of 1/60 second, for example.

The palette data generation unit 54 generates standard frame data B0, which is used for generating palette data, from the frame data Fr0. Here, it is assumed that a first frame data Fr0 in frames, which are arranged in time series, is used as the standard frame data B0. However, an arbitrary frame data may be used as the standard frame data B0. Alternatively, all of the sets of frame data Fr0 or a plurality of sets of frame data Fr0', which is selected from all of the sets of frame data Fr0, may be combined as a single set of image data, and the combined frame data may be generated as the standard frame data B0. The standard frame data B0 may also be generated by averaging all of the sets of frame data Fr or a plurality of sets of frame data Fr, which is selected from all of the sets of frame data Fr. As the plurality of sets of frame data Fr0', frame data sampled by the frame sampling unit 55, which will be described later, may be used.

Further, the palette data generation unit 54 generates palette data P0 including a required number of colors for color reduction processing, based on the standard frame data B0. Specifically, the palette data P0 may be generated by using a median cut method or the like. However, the generation method of the palette data P0 is not limited to the median cut method.

Here, the median cut method is a method for obtaining palette colors to be included in the palette data. In the median cut method, each of the RGB color data included in the standard frame data B0 is plotted in three-dimensional RGB color space, a median value in the existing range of the color data in the three-dimensional space is obtained, and the obtained median value is used as one of the palette colors included in the palette data. Further, the space is divided into two parts by using the median value, and a median value in each of the divided parts of the space is obtained. These processes are repeated until the number of obtained colors reaches the number of colors in the palette data (256 colors, for example).

The frame sampling unit 55 samples frame data Fr1, which should be included in the color reduction image, from the frame data Fr0. Specifically, the frame sampling unit 55 refers to the table L1 illustrated in FIG. 2 and obtains information regarding the number of frames of the color reduction moving image, which can be displayed at the mobile terminal device 3, which has requested the transmission. The frame sampling unit 55 samples the frame data Fr1, which corresponds to the number of frames. The frame sampling unit 55 samples the frame data Fr1 in the period of time, which is obtained by dividing reproduction time of the moving image data M0 by the number of frames. Besides sampling the frame data, new frame data may be generated by interpolating between frames.

The processing unit 56 performs color reduction processing on the frame data Fr1, which was sampled by the frame sampling unit 55, by using the palette data P0. Specifically, the processing unit 56 performs color reduction processing using error diffusion processing. The color reduction processing using error diffusion processing will be described below.

Figure 4:
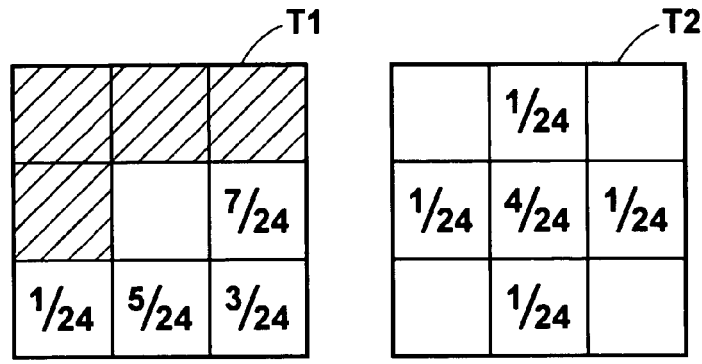
FIG. 4 illustrates an example of a matrix, which is used for error diffusion processing.
Figure 5A:
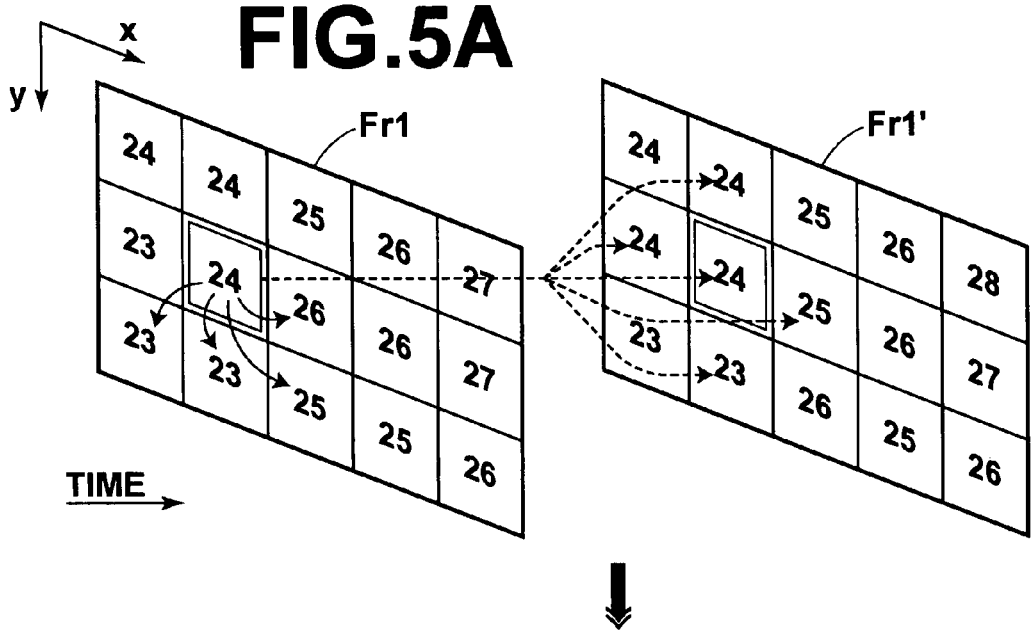
FIG. 5A is a diagram for explaining the error diffusion processing.
Figure 5B:
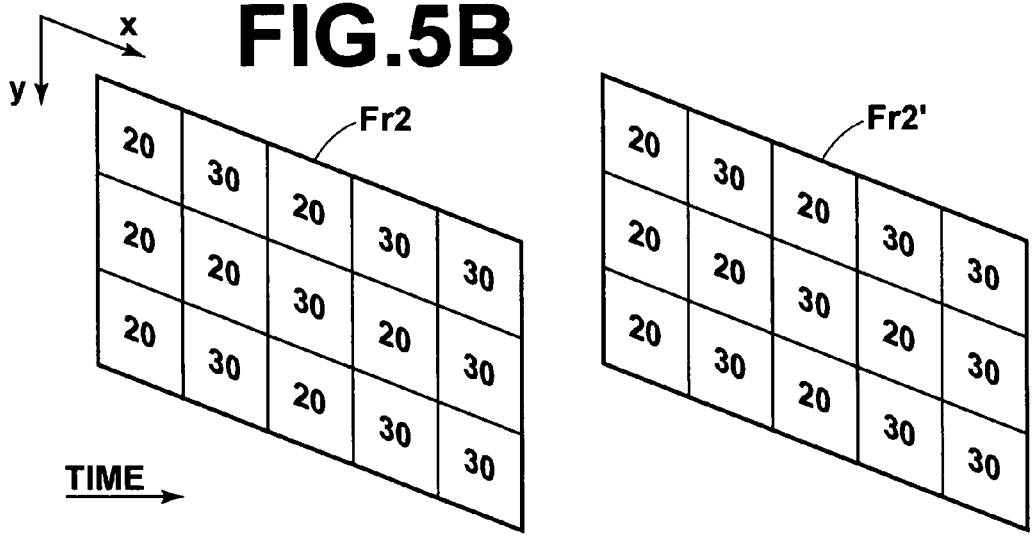
FIG. 5B is a diagram for explaining the error diffusion processing.

FIG. 4 is an example of a matrix, which is used for the error diffusion processing. FIGS. 5A and 5B are diagrams for explaining the error diffusion processing. Here, to simplify explanations, it is assumed that a frame represented by the frame data Fr1 includes 5×3 pixels, and the position of each pixel is represented by using (x, y) coordinates. It is assumed that the pixel (1, 1) is a start point. The color reduction processing is performed by performing the error diffusion processing sequentially in the x direction and moving a pixel string, on which error diffusion processing is performed, in the y direction. It is also assumed that the palette data includes only four values of 10, 20, 30 and 40.

As illustrated in FIG. 4, matrices for error diffusion processing include a matrix T1 for the processing object frame data Fr1 and a matrix T2 for the temporally consecutive next frame data Fr1' of the processing object frame data Fr1. Each of the matrix T1 and the matrix T2 includes 3×2 elements. The matrix T1 is used to diffuse an error generated at a color reduction processing object pixel (namely, a pixel P0, which corresponds to the center of elements in the matrix). The error is diffused to four neighboring pixels at the right side, the lower right side, the lower side and the lower left side of the pixel P0 in the ratios of 7/24, 3/24, 5/24, and 1/24, respectively. The matrix T2 is used to diffuse the error generated at the pixel P0 to a pixel (P0'), which corresponds to the pixel P0, and four neighboring pixels of the pixel P0' at the upper side, the lower side, the left side, and the right side in the temporally consecutive next frame data Fr1', in the ratios of 4/24, 1/24, 1/24, 1/24 and 1/24, respectively. The ratio of the error, which is diffused to the pixel P0', is larger than the ratio of the error, which is diffused to the neighboring pixels of the pixel P0'. Since the error diffusion processing has been performed on neighboring pixels of the pixel P0 at the upper left side, the upper side, the upper right side and the left side of the pixel P0, the elements at the upper left side, the upper side, the upper right side and the left side of the element at the center of the matrix T1 do not have any values.

If the error diffusion processing object is the pixel (2, 2), since the pixel value of the pixel (2, 2) in the frame data Fr1 is 24 as illustrated in FIG. 5A, the pixel value of the pixel (2, 2) is changed to 20, which is the closest value to 24 among the values included in the palette data. Consequently, an error of 4 is generated at the pixel (2, 2). Therefore, the error of 4 is diffused to the pixels (3, 2), (3, 3), (2, 3), and (1, 3) in the ratios of 7/24, 3/24, 5/24, and 1/24, respectively, by using the matrix T1. Then, the error of 4 is diffused to the pixels (2, 2), (2, 1), (3, 2), (2, 3), and (1, 2) in the next frame data Fr1' in the ratios of 4/24, 1/24, 1/24, 1/24, and 1/24, respectively, by using the matrix T2.

Next, error diffusion processing is performed on the pixel (3, 2) in the frame data Fr1. In the frame data Fr1, the original pixel value of the pixel (3, 2) was 26, However, since when error diffusion processing was performed on the pixel (2, 2), a value of 7×4/16 was added to 26, the pixel value of the pixel (3, 2) is about 27.7. Therefore, the pixel value of the pixel (3, 2) is changed to 30, which is the closest value to 27.7 among the values included in the palette data. Consequently, an error of −2.3 is generated at the pixel (3, 2). The error of −2.3 is diffused to pixels (4, 2), (4, 3), (3, 3), and (2, 3), which are neighboring pixels of the pixel (3, 2), in the frame data Fr1 and a corresponding pixel (3, 2) and neighboring pixels (3, 1), (4, 2), (3, 3), and (2, 2) of the corresponding pixel (3, 2) in the next frame data Fr1' by using the matrix T1 and the matrix T2. Then, the error diffusion processing is performed on all of the pixels sequentially to diffuse an error generated at each pixel, which is a processing object, to neighboring pixels of the processing object pixel and to a corresponding pixel in the next frame data Fr1'. Accordingly, frame data Fr2, of which color is reduced, is obtained.

Meanwhile, as illustrated in FIG. 5A, the pixel value of the pixel (2, 2) in the frame, which is represented by the next frame data Fr1' of the frame data Fr1, is 24. However, since the error of 4 generated at the pixel (2, 2) in the previous frame data Fr1 is added to the pixel value of the pixel (2, 2) in the frame data Fr1' in the ratio of 4/24, the pixel value of the pixel (2, 2) in the frame data Fr1' is changed to about 24.2. Then, the pixel value of the pixel (2, 2) is changed to 20, which is the closest value to 24.2 among the values included in the palette data. Then, error diffusion processing is performed and an error generated at each pixel is diffused to neighboring pixels of the processing object pixel and a corresponding pixel in the next frame data in the same manner as the case of the frame data Fr1. Accordingly, frame data Fr2', of which color is reduced, is obtained.

The frame sampling unit 55 performs the processing as described above on all of the sets of frame data Fr1, which have been sampled, and the frame data Fr2, of which color is reduced, is generated.

The frame combination unit 57 arranges the sets of frame data Fr2, which are generated by the processing unit 56, in time series and combines the sets of frame data Fr2 into a single file. Accordingly, the frame combination unit 57 generates color reduction raw moving image data R0 to reproduce the image of each frame consecutively in switching frames.

The encoding unit 58 encodes the color reduction raw moving image data R0, and generates color reduction moving image data R1. Here, animation gif (Graphic Interchange Format) and mng (Multiple-Image Network Graphics) for png (Portable Network Graphic Network), which corresponds to the animation gif, may be used as the file format of the color reduction moving image data R1. However, the file format of the color reduction moving image data R1 is not limited to the gif or the mng.

The color reduction moving image output unit 59 outputs the color reduction moving image data R1, which is generated by the encoding unit 58, to the image output unit 16.

Figure 6:
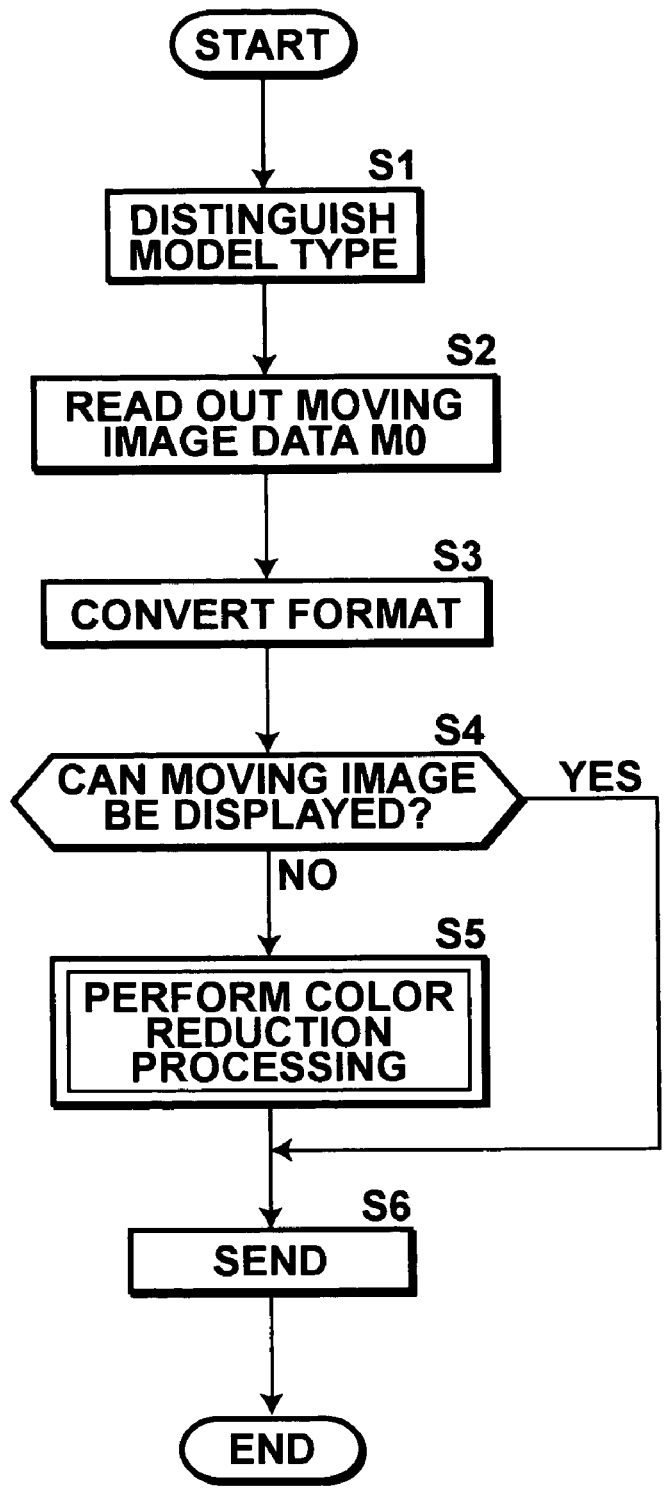
FIG. 6 is a flow chart illustrating processing performed in the first embodiment.

Next, processing in the first embodiment will be described. FIG. 6 is a flow chart illustrating the processing in the first embodiment. The request receiving unit 12 receives a moving image distribution request, which is sent from the mobile terminal device 3, and processing starts. The model type distinguishing unit 13 distinguishes the model type of the mobile terminal device 3 based on the model type information included in the request (step S1). Then, the moving image format conversion unit 14 reads out the moving image data M0, which includes a file name included in the request, from the moving image storage unit 11 (step S2). The moving image format conversion unit 14 refers to the table L1 and converts the format of the moving image data M0 into a format, which is appropriate for the model type of the mobile terminal device 3, which has requested transmission. Accordingly, the moving image format conversion unit 14 obtains the moving image data M1, of which format has been converted (step S3).

Next, the color reduction processing unit 15 judges whether the model type of the mobile terminal device 3, which has requested transmission, is a model type, which can display moving images (step S4). If step S4 is NO, the color reduction processing unit 15 performs color reduction processing on the moving image data M1 (step S5).

Figure 7:
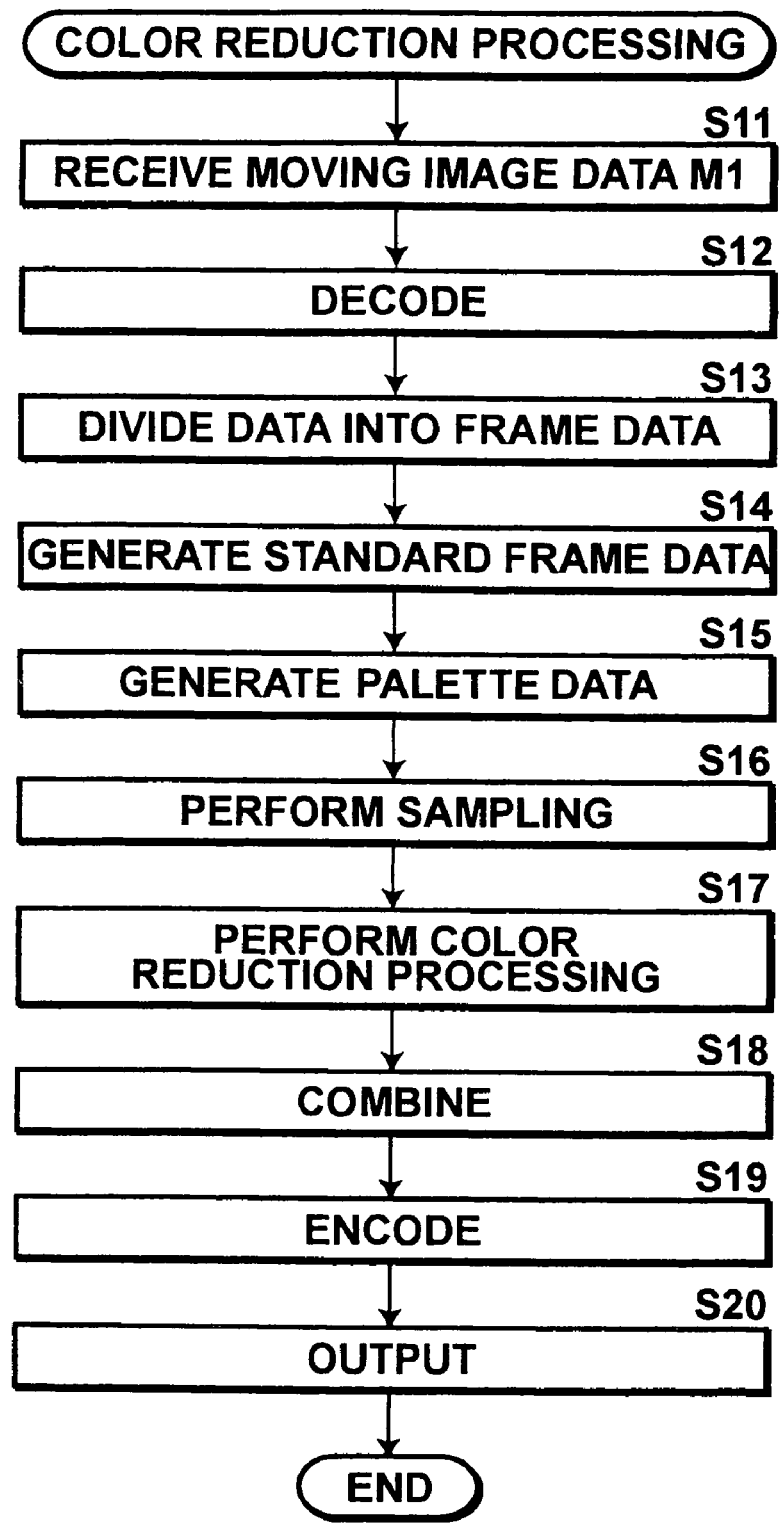
FIG. 7 is a flow chart illustrating the color reduction processing.

FIG. 7 is a flow chart illustrating the color reduction processing. First, the moving image input unit 51 receives an input of the moving image data M1 (step S11). The decoding unit 52 decodes the moving image data M1, and obtains the raw moving image data M1' (step S12). Then, the frame division unit 53 divides the raw moving image data M1' into frame data Fr0, which is image data for each frame (step S13). The palette data generation unit 54 generates the standard frame data B0 based on the frame data Fr0 (step S14). Further, the palette data generation unit 54 generates the palette data P0 based on the standard frame data B0 (step S15).

Meanwhile, the frame sampling unit 55 samples frame data Fr1, which should be included in the color reduction moving image, from the frame data Fr0 (step S16). The processing in step S16 may be performed before the processing in steps S14 and S15. Alternatively, the processing in steps S14, S15 and S16 may be performed in parallel.

Then, the processing unit 56 generates the frame data Fr2, of which color is reduced, by performing color reduction processing on the frame data Fr1, which has been sampled by the frame sampling unit 55, using error diffusion processing (step S17). In the error diffusion processing, an error is diffused to the temporally consecutive frame data by using the palette data as described above. Next, the frame combination unit 57 arranges the frame data Fr2, which was generated by the processing unit 56, in time series and combines the frame data Fr2 into a single file. Accordingly, the frame combination unit 57 generates the color reduction raw moving image data R0 (step S18). The encoding unit 58 encodes the color reduction raw moving image data R0, and generates the color reduction moving image data R1 (step S19). Further, the color reduction moving image output unit 59 outputs the color reduction moving image data R1 (step S20), and the color reduction processing ends.

Processing returns to the processing illustrated in FIG. 6, and if step S4 is YES and the color reduction processing in step S5 ends, the image output unit 16 sends the color reduction moving image data R1 or the moving image data M1 to the mobile terminal device 3, which has requested the transmission (step S6), and processing ends.

The mobile terminal device 3 receives the color reduction moving image data R1 or the moving image data M1. Here, if the mobile terminal device 3 can reproduce moving images, the moving image data M1 is sent to the mobile terminal device 3, and the moving images can be displayed. In contrast, if the mobile terminal device 3 cannot reproduce the moving images, the color reduction moving image data R1 is sent to the mobile terminal device 3, and frames, which have been sampled from the moving image data M1, are displayed consecutively based on the color reduction moving image data R1 in switching the frames. Accordingly, images with movement are displayed.

Here, the color reduction image includes a plurality of frames, and has a characteristic, which is similar to the characteristic of an moving image, that a corresponding pixel in each frame closely correlates with each other. Therefore, when the error diffusion processing is performed, an error generated at each pixel in a frame represented by the frame data Fr1 is diffused to a corresponding pixel position and the neighboring pixel positions of the corresponding pixel position in the frame, which is represented by the temporally consecutive next frame data Fr1'. Accordingly, when the color reduction moving image data R1 is reproduced, the color reduction processing can be performed so that the discontinuity in colors between the frames is reduced. Therefore, in comparison with the case of performing error diffusion processing only within a frame, the continuity in colors between frames can be improved, and color reduction moving image data R1 for producing higher quality color reduction moving images can be generated.

Figure 8:
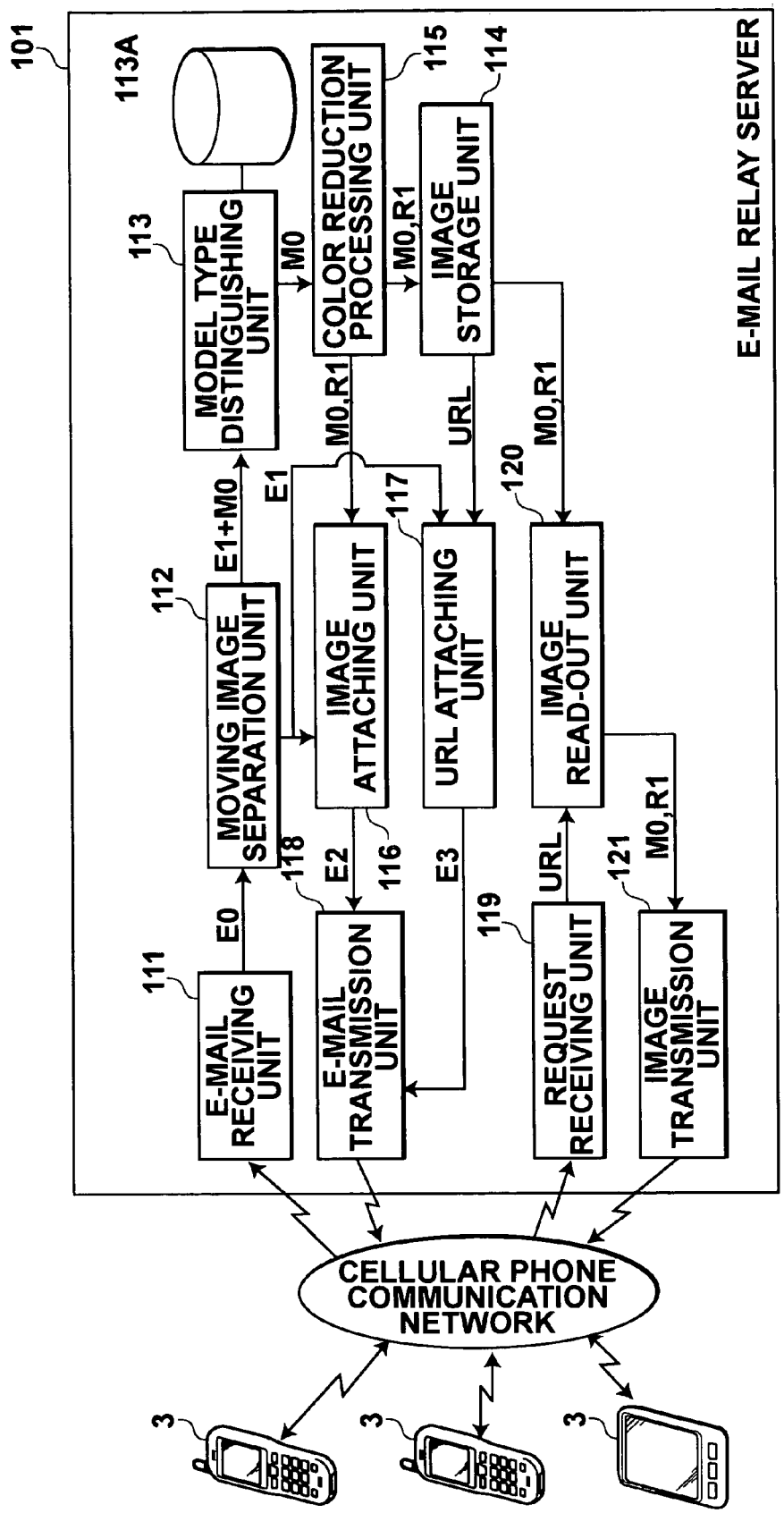
FIG. 8 is a schematic block diagram illustrating the configuration of an e-mail system, to which an e-mail relay device according to a second embodiment of the present invention is applied.

Next, a second embodiment of the present invention will be described. FIG. 8 is a schematic block diagram illustrating the configuration of an e-mail system, to which a moving image conversion device and a e-mail relay device according to the second embodiment of the present invention are applied. As illustrated in FIG. 8, the e-mail system according to the present embodiment includes an e-mail relay server 101. In the e-mail system according to the present embodiment, an e-mail, to which a moving image is attached, is sent from the mobile terminal device 3 such as a cellular camera phone, a PHS with a camera and a PDA with a camera, which can capture moving images, and the e-mail is relayed by the e-mail relay server 101 and sent to a destination of the e-mail.

As illustrated in FIG. 8, the e-mail relay server 101 includes an e-mail receiving unit 111, a moving image separation unit 112, a model type distinguishing unit 113, an image storage unit 114, a color reduction processing unit 115, an image attaching unit 116, a URL (Uniform Resource Locator) attaching unit 117, an e-mail transmission unit 118, a request receiving unit 119, an image read-out unit 120, and an image transmission unit 121.

The e-mail receiving unit 111 receives an e-mail E0, to which moving image data M0 representing a moving image is attached. The e-mail E0 was sent from a mobile terminal device 3.

The moving image separation unit 112 separates the moving image data M0 from the e-mail E0, and generates a mail body E1, which includes all the information in the e-mail E1 except the moving image data M0. The mail body E1 includes a mail text and a header including various kinds of information such as a sender's mail address and a destination mail address. The moving image separation unit 112 inputs the mail body E1 and the moving image data M0 to the model type distinguishing unit 113.

The model type distinguishing unit 113 refers to a database 113A, which shows the correspondence between mail addresses and model types, and judges whether the mobile terminal device 3 at the destination can display moving images based on the mail address of a mobile terminal device 3 at the destination, which is included in the header of the mail body E1. The model type distinguishing unit 133 also judges whether the mobile terminal device 3 at the destination can receive the e-mail, to which the moving image is attached, without reducing the number of colors.

Here, judgment results by the model type distinguishing unit 113 are described below:

(1) The mobile terminal device 3 at the destination can display moving images and receive an e-mail, to which an image is attached, without reducing the number of colors;

(2) The mobile terminal device 3 at the destination cannot display moving image, but the mobile terminal device 3 can receive an e-mail, to which an image is attached, without reducing the number of colors;

(3) The mobile terminal device 3 at the destination can display the moving image, but the mobile terminal device 3 cannot receive an e-mail, to which an image is attached, without reducing the number of colors; and (4) The mobile terminal device 3 at the destination cannot display the moving image nor receive an e-mail, to which an image is attached, without reducing the number of colors.

If the judgment is as described in the above item (1), the model type distinguishing unit 113 inputs the moving image data M0 to the image attaching unit 116 without causing the color reduction processing unit 115 to perform color reduction processing. Further, the moving image separation unit 112 inputs the mail body E1 to the image attaching unit 116.

If the judgment is as described in the above item (2), the model type distinguishing unit 113 inputs the moving image data M0 to the color reduction processing unit 115 to cause the color reduction processing unit 115 to perform color reduction processing. Further, the moving image separation unit 112 inputs the mail body E1 to the image attaching unit 116.

If the judgment is as described in the above item (3), the model type distinguishing unit 113 inputs the moving image data M0 to the image storage unit 114 without causing the color reduction processing unit 115 to perform color reduction processing. Further, the moving image separation unit 112 inputs the mail body E1 to the URL attaching unit 117.

If the judgment is as described in the above item (4), the model type distinguishing unit 113 inputs the moving image data M0 to the color reduction processing unit 115 and causes the color reduction processing unit 115 to perform color reduction processing. Further, the moving image separation unit 112 inputs the mail body E1 to the URL attaching unit 117.

The image storage unit 114 stores the moving image data M0 and the color reduction moving image data R1, which is generated by the color reduction processing unit 115.

If the model type of the mobile terminal device 3 at the destination is a model type, which cannot display the moving image, the color reduction processing unit 115 converts the moving image data M0 into the color reduction moving image data R1. The configuration of the color reduction processing unit 115 is the same as that of the color reduction processing unit 15 in the moving image distribution server 1 in the first embodiment as described above. Further, the processing in the color reduction processing unit 115 is also the same as the processing in the color reduction processing unit 15. Therefore, detailed explanations on the color reduction unit 115 will be omitted.

If the mobile terminal device 3 at the destination can receive the e-mail, to which an image is attached, without reducing the number of colors, the image attaching unit 116 attaches the moving image data M0 or the color reduction moving image data R1 to the mail body E1, and generates an e-mail E2, to which an image is attached.

If the mobile terminal device 3 at the destination cannot receive the e-mail, to which the image is attached, without reducing the number of colors, the URL attaching unit 117 attaches a URL of a storage location of the moving image data M0 or the color reduction moving image data R1 in the image storage unit 114 to the mail body E1, and generates an e-mail E3, to which the URL is attached.

The e-mail transmission unit 118 sends the e-mail E2 or the e-mail E3 to the mobile terminal device 3 at the destination via a cellular phone communication network.

The request receiving unit 119 receives an image download request from the mobile terminal device 3, which has received the e-mail E3, to which the URL is attached. The image distribution request from the mobile terminal device 3 includes the URL of the storage location of the moving image data M0 or the color reduction moving image data R1.

The image read-out unit 120 refers to the URL included in the request, which has been received by the request receiving unit 119, and reads out the moving image data M0 or the color reduction moving image data R1 from the image storage unit 114.

The image transmission unit 121 sends the moving image data M0 or the color reduction moving image data R1, which has been read out by the image read-out unit 120, to the mobile terminal device 3, which sent the request, via the cellular phone communication network.

Figure 9:
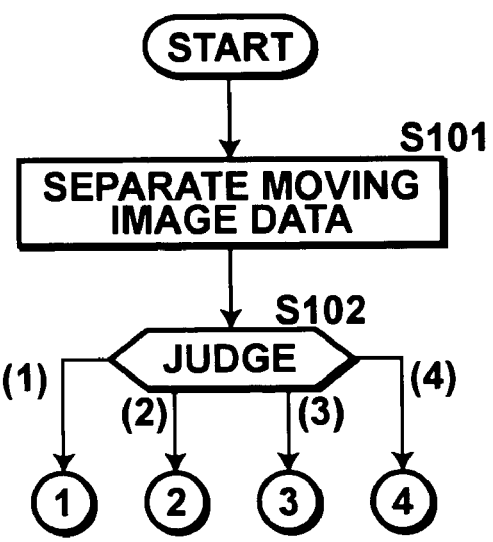
FIG. 9 is a flow chart (No. 1) illustrating processing performed in the second embodiment.

Next, processing in the second embodiment will be described. FIG. 9 is a flow chart illustrating the processing performed in the second embodiment. When the e-mail receiving unit 111 receives an e-mail E0, to which moving image data M0 is attached, from the mobile terminal device 3, processing starts. Then, the moving image separation unit 112 separates the moving image data M0 from the e-mail E0 (step S101). Next, the model type distinguishing unit 113 refers to the database 113A, and judges which item the mobile terminal device 3 at the destination satisfies among the above items (1)-(4), based on the mail address of the mobile terminal device 3, which is included in the header of the mail body E1 (step S102).

Figure 10:
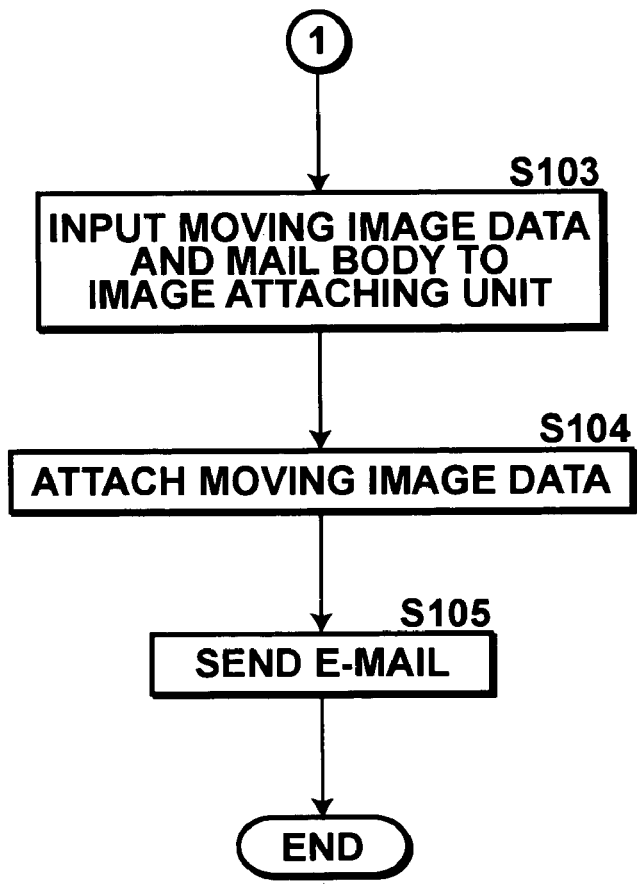
FIG. 10 is a flow chart (No. 2) illustrating processing performed in the second embodiment.

If the mobile terminal device 3 satisfies the item (1), processing goes to the steps illustrated in the flow chart of FIG. 10. Then, the model type distinguishing unit 113 inputs the moving image data M0 to the image attaching unit 116, and the moving image separation unit 112 inputs the mail body E1 to the image attaching unit 116, respectively (step S103). The image attaching unit 116 attaches the moving image data M0 to the mail body E1, and generates the e-mail E2, to which the image is attached (step S104). The e-mail transmission unit 118 sends the e-mail E2 to the mobile terminal device 3 at the destination (step S105), and processing ends.

Since the mobile terminal device 3, which has received the e-mail E2, can display the moving image, the moving image data M0, which is attached to the e-mail E2, is displayed.

Figure 11:
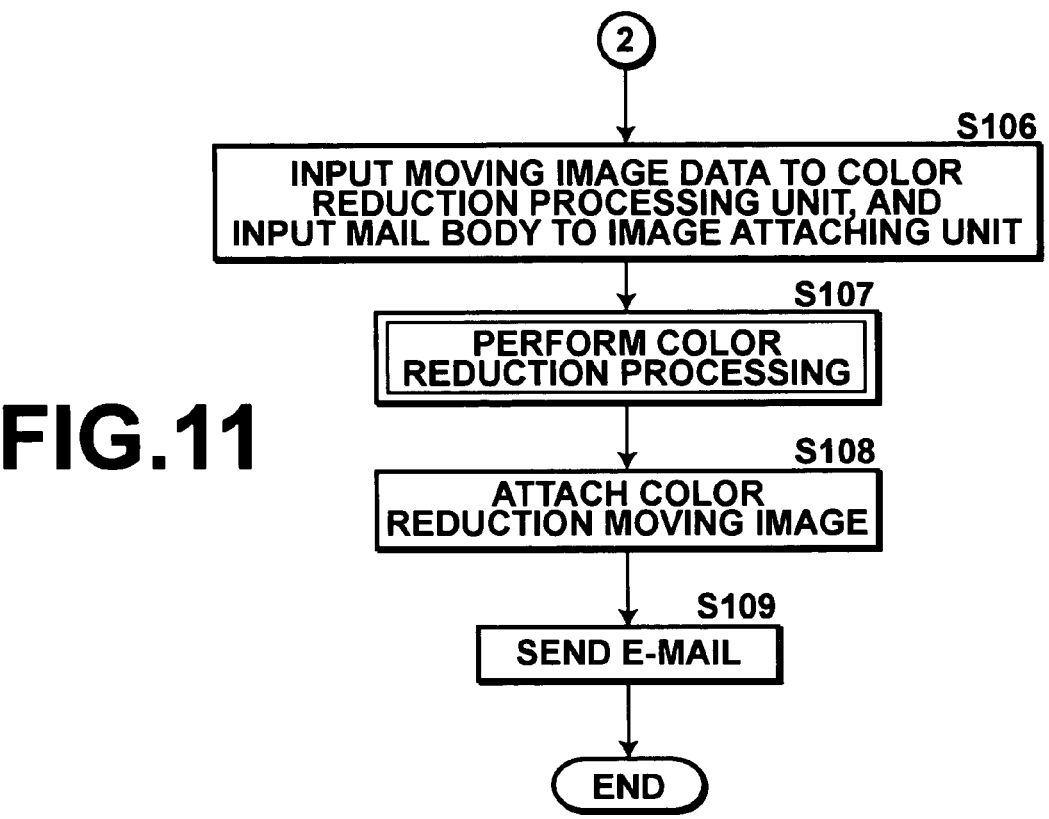
FIG. 11 is a flow chart (No. 3) illustrating processing performed in the second embodiment.

Meanwhile, if the mobile terminal device 3 satisfies the item (2), processing goes to the steps illustrated in the flow chart of FIG. 11. Then, the model type distinguishing unit 113 inputs the moving image data M0 to the color reduction processing unit 115, and the moving image separation unit 112 inputs the mail body E1 to the image attaching unit 116 (step S106). The color reduction processing unit 115 performs color reduction processing on the moving image data M0 (step S107). The color reduction processing is performed using the error diffusion processing in the similar manner to the color reduction processing in the first embodiment. In the error diffusion processing, an error generated at each pixel in the frame, which is represented by the frame data Fr1, is also diffused to a corresponding pixel position in a frame, which is represented by the temporally consecutive next frame data Fr1'.

After step S107, the image attaching unit 116 attaches the color reduction moving image data R1 to the mail body E1, and generates the e-mail E2, to which the image is attached (step S108). Then, the e-mail transmission unit 118 sends the e-mail E2 to the mobile terminal device 3 at the destination (step S109), and processing ends.

The mobile terminal device 3, which has received the e-mail E2, cannot display the moving image. Therefore, the mobile terminal device 3 displays frames, which have been sampled from the moving image data M0, consecutively in switching frames based on the color reduction moving image data R1 attached to the received e-mail E2. Accordingly, the mobile terminal device 3 can display images with movement.

Figure 12:
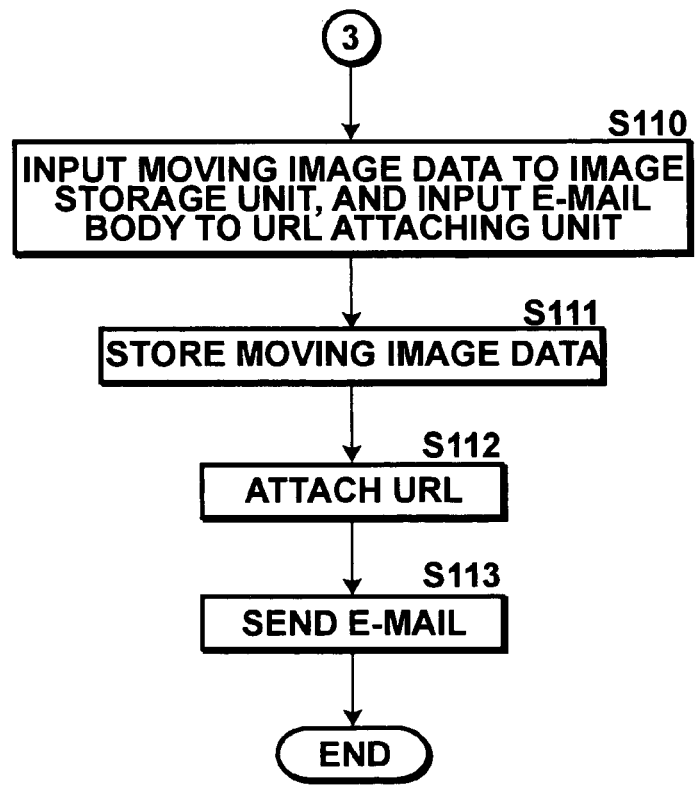
FIG. 12 is a flow chart (No. 4) illustrating processing performed in the second embodiment.

If the mobile terminal device 3 satisfies the item (3), processing goes to the steps illustrated in the flow chart of FIG. 12. Then, the model type distinguishing unit 113 inputs the moving image data M0 to the image storage unit 114, and the moving image separation unit 112 inputs the mail body E1 to the URL attaching unit 117 (step S110). The image storage unit 114 stores the moving image data M0 (step S111). The URL attaching unit 117 attaches the URL of the storage location of the moving image data M0 to the mail body E1, and generates the e-mail E3, to which the URL is attached (step S112). Then, the e-mail transmission unit 118 sends the e-mail E3 to the mobile terminal device 3 at the destination (step S113), and processing ends.

Figure 13:
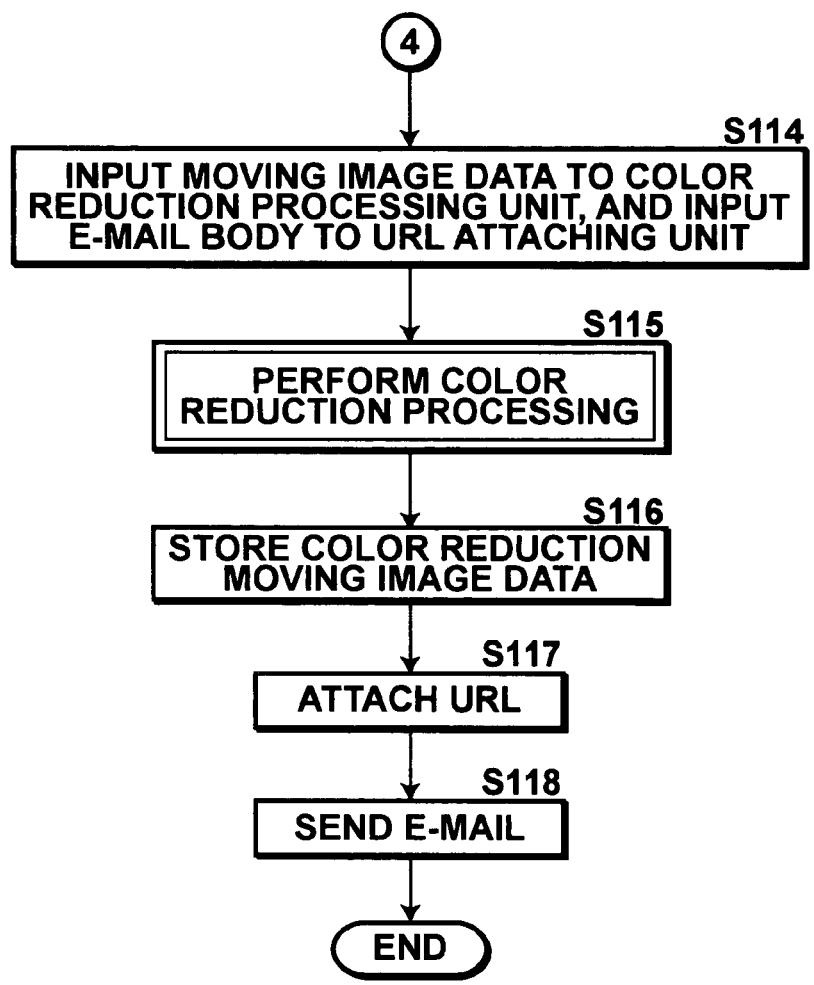
FIG. 13 is a flow chart (No. 5) illustrating processing performed in the second embodiment.

If the mobile terminal device 3 satisfies the item (4), processing goes to the steps illustrated in the flow chart of FIG. 13. Then, the model type distinguishing unit 113 inputs the moving image data M0 to the color reduction processing unit 115, and the moving image separation unit 112 inputs the mail body E1 to the URL attaching unit 117 (step S114). The color reduction processing unit 115 performs color reduction processing on the moving image data M0 (step S115). The image storage unit 114 stores the color reduction moving image data R1 (step S116). The URL attaching unit 117 attaches the URL of the storage location to the mail body E1, and generates the e-mail E3, to which the URL is attached (step S117). Then, the e-mail transmission unit 118 sends the e-mail E3 to the mobile terminal device 3 at the destination (step S118), and processing ends.

If the mobile terminal device 3 satisfies the item (3) or (4) as described above, the mobile terminal device 3, which has received the e-mail E3, sends a download request of the moving image data M0 or the color reduction moving image data R1 to the e-mail relay server 101.

Figure 14:
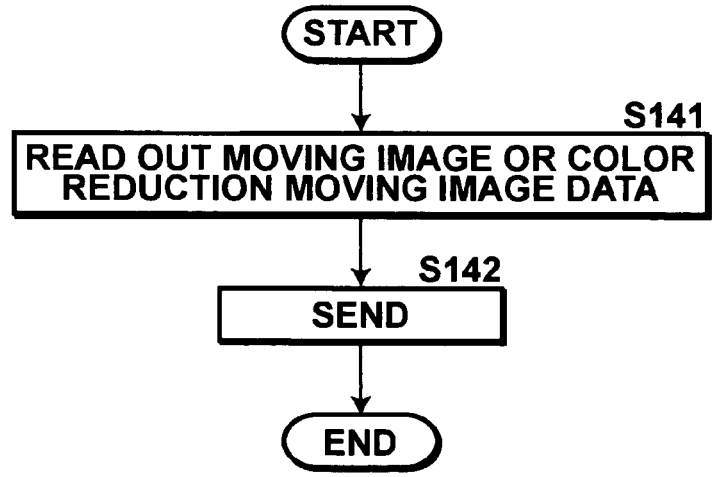
FIG. 14 is a flow chart illustrating processing performed at the e-mail relay server when a request is sent.

FIG. 14 is a flow chart illustrating the processing performed by the e-mail relay server 101 when the request is sent to the e-mail relay server 101. When the request receiving unit 119 receives a download request, the e-mail relay server 101 starts processing. The image read-out unit 120 refers to a URL included in the request, and reads out the moving image data M0 or the color reduction moving image data R1 from the image storage unit 114 (step S141). Then, the image transmission unit 121 sends the moving image data M0 or the color reduction moving data R1 to the mobile terminal device 3, which has sent the request (step S142), and processing ends.

The mobile terminal device 3 receives the color reduction moving image data R1 or the moving image data M0. Here, if the mobile terminal device 3 can reproduce the moving image, the moving image data M0 is sent. In contrast, if the mobile terminal device 3 cannot reproduce the moving image, the color reduction moving image data R1 is sent, and frames, which have been sampled from the moving image data M0, are displayed consecutively based on the color reduction moving image data R1 in switching frames, and images with movement are displayed.

As described above, in the second embodiment, the color reduction processing using the error reduction processing is performed in the similar manner to the first embodiment. In the color reduction processing using the error reduction processing, an error generated at each pixel in a frame represented by the frame data Fr1 is also diffused to a corresponding pixel position in a frame represented by the temporally consecutive next frame data Fr1'. Therefore, when the color reduction moving image data R1 is reproduced, the color reduction processing can be performed so that the discontinuity in colors between frames is reduced. Hence, in comparison with the case of performing the error diffusion processing only within a frame, the continuity in colors between frames can be improved, and the color reduction moving image data R1, from which a higher quality color reduction moving image can be produced, can be generated.

In the second embodiment as described above, the moving image separation unit 112 temporarily stores the e-mail E0, to which the moving image data M0 is attached. If the model type distinguishing unit 133 judges that the mobile terminal device 3 satisfies the item (1) as described above, the transmission unit 118 may send the e-mail E0, to which the moving image data M0 is attached, to the mobile terminal device 3 at the destination without reducing the number of colors.

Figure 15:
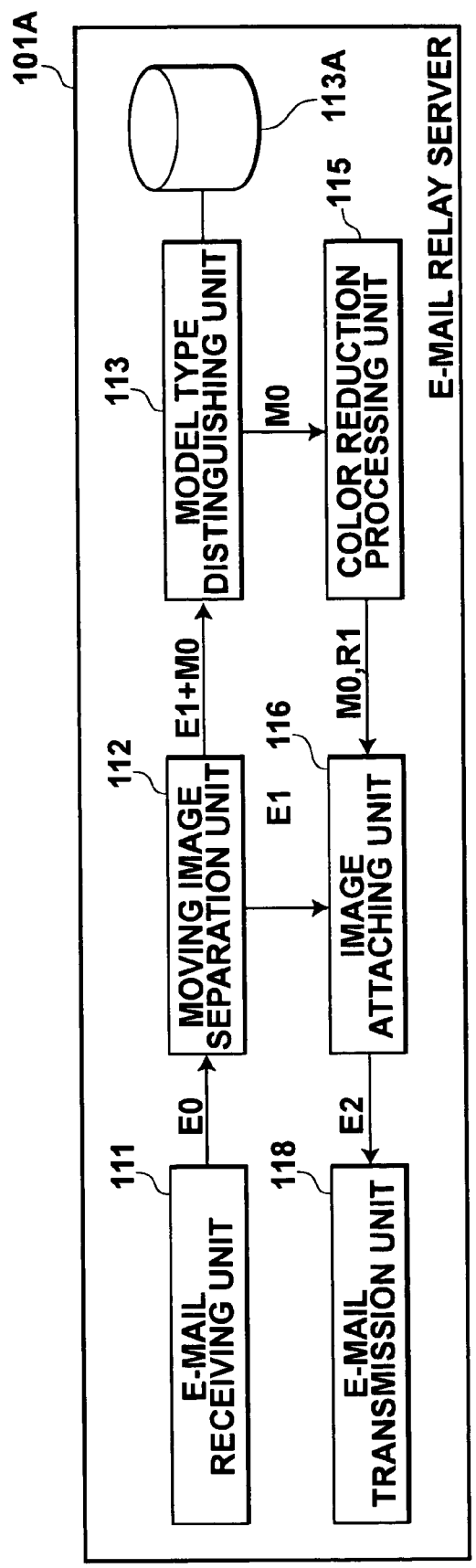
FIG. 15 is a schematic block diagram illustrating the configuration of an e-mail system, to which a e-mail relay device according to a third embodiment of the present invention is applied.

In the second embodiment as described above, the e-mail relay server 101 relays the e-mail regardless of whether the mobile terminal device 3 at the destination can receive the e-mail, to which the image is attached, without reducing the number of colors. However, the e-mail relay server 101 may also be configured as a specialized relay server 101, which is used when the mobile terminal device 3 at the destination can receive the e-mail, to which the image is attached, without reducing the number of colors. The e-mail relay server (called 101A) which is configured in this manner as a third embodiment is illustrated in FIG. 15. When the e-mail relay server 101A in FIG. 15 and the e-mail relay server 101 in FIG. 8 are compared, the image storage unit 114, the URL attaching unit 117, the request receiving unit 119, the image read-out unit 120, and the image transmission unit 121 in the e-mail relay server 101 are not in the e-mail relay server 101A.

Figure 16:
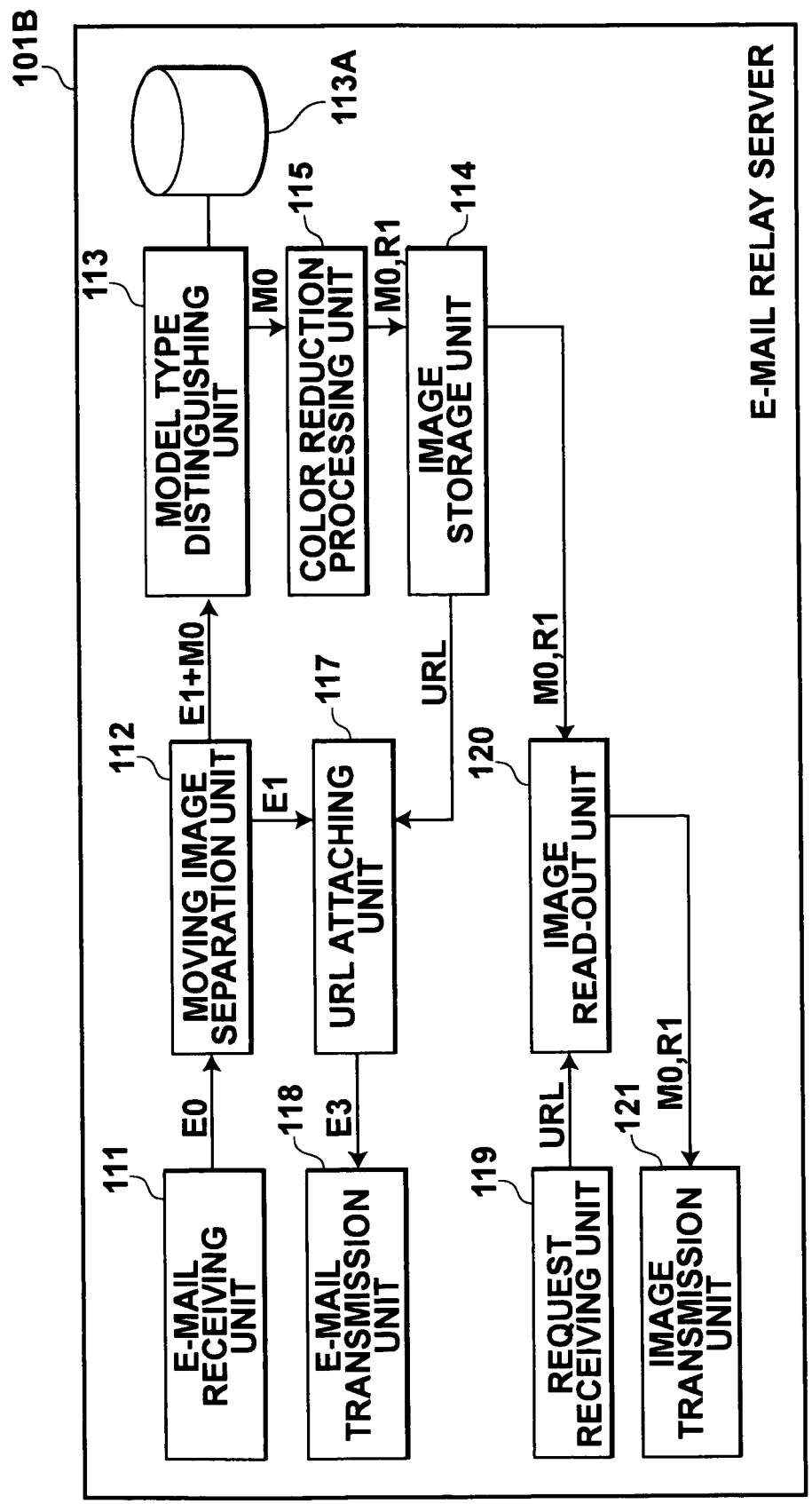
FIG. 16 is a schematic block diagram illustrating the configuration of an e-mail system, to which a e-mail relay device according to a fourth embodiment of the present invention is applied.

Alternatively, the e-mail relay server 101 may also be configured as a specialized e-mail relay server, which is used when the mobile terminal device 3 at the destination cannot receive the e-mail, to which the image is attached, without reducing the number of colors. The e-mail relay server (called 101B), which is configured in this manner, is illustrated in FIG. 16 as a fourth embodiment. When the e-mail relay server 101B in FIG. 16 and the e-mail relay server 101 in FIG. 8 are compared, the image attaching unit 116 in the e-mail relay server 101 is not in the e-mail relay server 101B.

In the first to fourth embodiments as described above, a file size of image data, which can be displayed at the mobile terminal device 3, is limited. Therefore, if the color reduction moving image data R1 is sent to the mobile terminal device 3 without considering the limitation in the file size, even if the color reduction moving image data R1 is sent, the mobile terminal device 3 may not display the color reduction image in some cases.

Therefore, the color reduction moving image data R1 is generated so that the file size is appropriate for the model type of the mobile terminal device 3, which has sent the request, or the model type of the mobile terminal device 3 at the destination. Accordingly, the problems that although the color reduction moving image data R1 is sent, the mobile terminal device 3 cannot display the color reduction moving image can be prevented.

Further, the color reduction processing unit 15 in the first embodiment and the color reduction processing unit 115 in the second to fourth embodiments may be used separately as a moving image conversion device for converting a moving image into a color reduction moving image. In this case, the moving image data M0 may be converted into the color reduction moving image data R1 regardless of the model type of the mobile terminal device 3.

Figure 17:
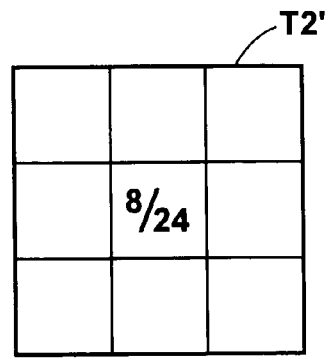
FIG. 17 illustrates another example of a matrix, which is used for the error diffusion processing.

Further, in the first to fourth embodiments as described above, the error generated at each pixel, which is an error diffusion processing object, in the frame, which is represented by the frame data Fr1, is diffused to a corresponding pixel position and neighboring pixel positions of the corresponding pixel position in the frame represented by the temporally consecutive next frame data Fr1' by using the matrix T2, which is illustrated in FIGS. 5A and 5B. However, when the error is diffused to the temporally consecutive next frame data Fr1', the error may be diffused only to the corresponding pixel position by using the matrix T2', which is illustrated in FIG. 17.

Figure 18A:
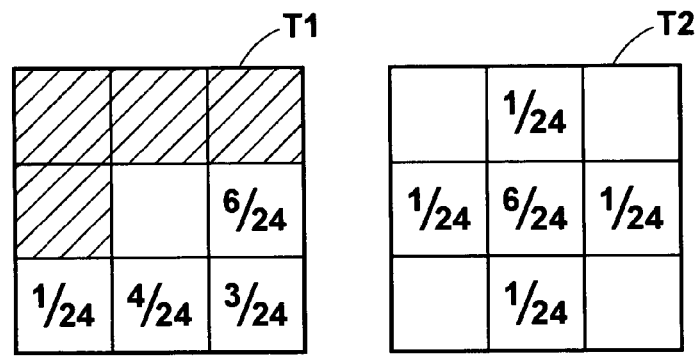
FIG. 18A illustrates another example of a matrix, which is used for the error diffusion processing.
Figure 18B:
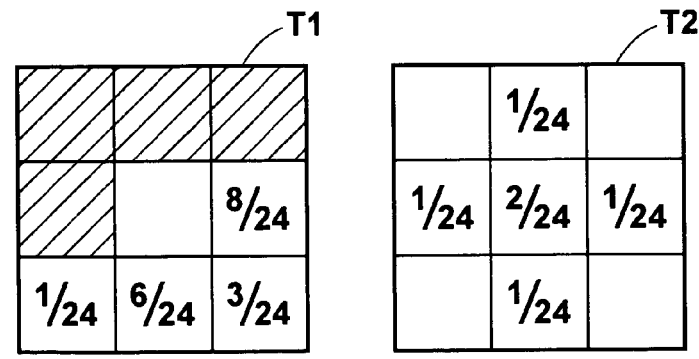
FIG. 18B illustrates another example of a matrix, which is used for the error diffusion processing.
Figure 19A:
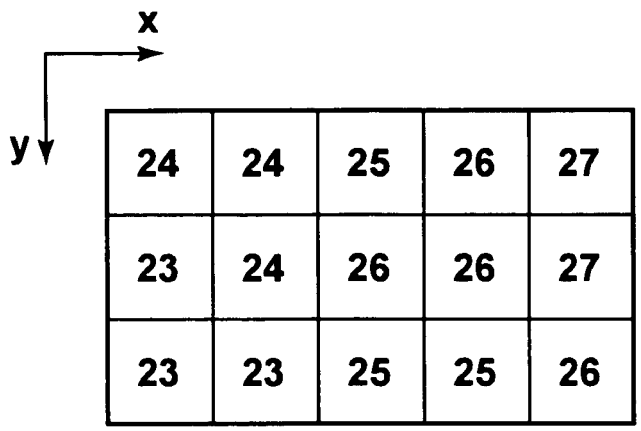
FIG. 19A is a diagram for explaining error diffusion processing according to a conventional technique.
Figure 19B:
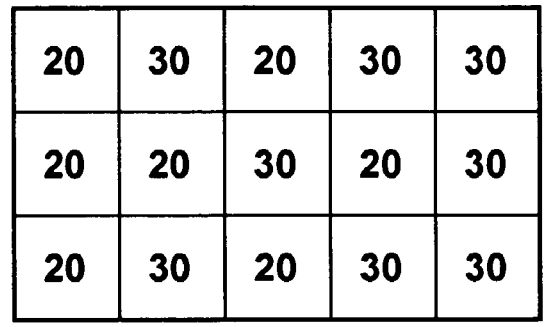
FIG. 19B is a diagram for explaining the error diffusion processing according to the conventional technique.
Figure 20:
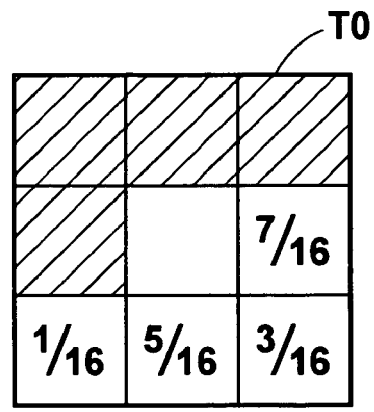
FIG. 20 illustrates an example of a matrix, which is used for error diffusion processing according to the conventional technique.

When the time interval between sets of frame data Fr1 for generating the color reduction moving image data R1 is shorter, the correlation between corresponding pixels in the frames represented by the sets of frame data Fr1 becomes higher. Therefore, it is preferable to increase the degree of diffusing the error to the corresponding pixel in the temporally consecutive frame if the number of frames per unit time in the frame data Fr1 is larger. For example, regarding the elements in the matrix T1 and T2, which are illustrated in FIGS. 5A and 5B, if the elements in the matrix T1 are decreased (7/24 is changed to 6/24, and 5/24 is changed to 4/24), and the elements in the matrix T2 are increased (4/24 is changed to 6/24) as illustrated in FIG. 18A, the degree of diffusing the error to the corresponding pixel position in the temporally consecutive next frame data may be increased. In contrast, regarding the elements in the matrix T1 and the matrix T2, which are illustrated in FIGS. 5A and 5B, if the elements in the matrix T1 are increased (7/24 is changed to 8/24, and 5/24 is changed to 6/24), and the elements in the matrix T2 are decreased (4/24 is changed to 2/24) as illustrated in FIG. 18B, the degree of diffusing the error to the corresponding pixel position in the temporally consecutive next frame data may be decreased.

The continuity of the colors between frames can be improved by increasing the degree of diffusing the error to the corresponding pixel in the temporally consecutive next frame, if the number of frames per unit time in the frame data Fr1 is larger. Accordingly, the color reduction moving image data R1, which can represent even higher quality color reduction moving image data, can be generated.

Further, in the first to fourth embodiments as described above, a single set of palette data is generated, and color reduction processing is performed. However, a single set of palette data may be generated for every few frames by using the method disclosed in Japanese Unexamined Patent Publication No. 11(1999)-259640, and color reduction processing may be performed by using the single set of palette data for every few frames.

What is claimed is:

1. A moving image conversion device for converting a moving image having a plurality of frames into a color reduction moving image including a predetermined number of colors, the device comprising:

a frame sampling means for sampling a plurality of frames for color reduction moving image production, which is used to produce the color reduction moving image, from the plurality of frames in the moving image;

a palette data generation means for generating palette data to produce the color reduction moving image;

a color reduction processing means for converting each of the plurality of frames for color reduction moving image production into a color reduction moving image frame by color reduction processing using error diffusion processing, wherein the error diffusion processing is performed with reference to the palette data and an error between the palette data and actual data, which is generated at each pixel position in each of the plurality of frames for color reduction moving image production, is diffused to a corresponding pixel position or a neighboring position of the corresponding pixel position, which includes the corresponding pixel position, in the temporally consecutive next frame for color reduction moving image production, of each of the plurality of frames for color reduction moving image production; and a frame combination means for combining the color reduction moving image frame to produce the color reduction moving image, and wherein the color reduction processing means increases the degree of diffusing the error to the corresponding pixel position in the temporally consecutive next frame for color reduction moving image production, when the number of the plurality of frames for color reduction moving image production per unit time is larger.

2. A moving image conversion device as defined in claim 1, wherein the file format of the color reduction moving image is animation gif (Graphic Interchange Format) or mng (Multiple-Image Network Graphics).

3. A moving image conversion device as defined in claim 1, wherein the palette data generation means generates the palette data by a median cut method.

4. A moving image conversion and moving image distribution device for sending a requested moving image to a transmission request terminal device, which has requested transmission of the moving image, the device comprising:

a model type distinguishing means for distinguishing the model type of the transmission request terminal device; and the moving image conversion device as defined in claim 1, wherein when the model type of the transmission request terminal device is a model type, which cannot display the moving image but can display a color reduction moving image, the requested moving image is converted to the color reduction moving image, and the color reduction moving image is sent to the transmission request terminal device instead of the moving image.

5. A moving image distribution device as defined in claim 4, wherein the model type distinguishing means distinguishes the model type of the transmission request terminal device based on model type information included in a moving image transmission request.

6. A moving image distribution device as defined in claim 4, wherein the transmission request terminal device is a cellular camera phone.

7. A moving image conversion and e-mail relay device for sending an e-mail, to which a moving image is attached, to a transmission destination terminal device, which is a transmission destination of the e-mail, the device comprising:
> a model type distinguishing means for distinguishing the model type of the transmission destination terminal device; and
> the moving image conversion device as defined in claim 1, wherein when the model type of the transmission destination terminal device is a model type, which cannot display the moving image but can display a color reduction moving image, the moving image, which is attached to the e-mail, is converted to the color reduction moving image, and the color reduction moving image is sent to the transmission destination terminal device instead of the moving image.

8. An e-mail relay device as defined in claim 7, wherein the model type distinguishing means distinguishes the model type of the transmission destination terminal device based on model type information included in a moving image transmission request.

9. An e-mail relay device as defined in claim 7, wherein the transmission destination terminal device is a cellular camera phone.

10. A moving image conversion method for converting a moving image having a plurality of frames into a color reduction moving image including a predetermined number of colors, the method comprising the steps of:
> sampling a plurality of frames using a frame sampling unit for color reduction moving image production, which is used to produce the color reduction moving image, from the plurality of frames in the moving image;
> generating palette data using a palette data generation unit to produce the color reduction moving image;
> converting each of the plurality of frames for color reduction moving image production into a color reduction moving image frame by color reduction processing using error diffusion processing, wherein the error diffusion processing is performed with reference to the palette data and an error between the palette data and actual data, which is generated at each pixel position in each of the plurality of frames for color reduction moving image production, is diffused to a corresponding pixel position or a neighboring pixel position of the corresponding pixel position, which includes the corresponding pixel position, in the temporally consecutive next frame for color reduction moving image production, of each of the plurality of frames for color reduction moving image production; and
> combining the color reduction moving image frame to produce the color reduction moving image, and
> wherein the color reduction processing increases the degree of diffusing the error to the corresponding pixel position in the temporally consecutive next frame for color reduction moving image production, when the number of the plurality of frames for color reduction moving image production per unit time is larger.

11. A computer executable program stored on a tangible computer readable medium for causing a computer to execute a moving image conversion method for converting a moving image having a plurality of frames into a color reduction moving image including a predetermined number of colors and for sending a requested moving image to a transmission request terminal device, which has requested transmission of the moving image, the program comprising the procedures for:
> distinguishing the model type of the transmission request terminal device;
> sampling a plurality of frames for color reduction moving image production, which is used to produce the color reduction moving image, from the plurality of frames in the moving image;
> generating palette data to produce the color reduction moving image;
> converting each of the plurality of frames for color reduction moving image production into a color reduction moving image frame by color reduction processing using error diffusion processing, wherein the error diffusion processing is performed with reference to the palette data and an error between the palette data and actual data, which is generated at each pixel position in each of the plurality of frames for color reduction moving image production, is diffused to a corresponding pixel position or a neighboring pixel position of the corresponding pixel position, which includes the corresponding pixel position, in the temporally consecutive next frame for color reduction moving image production, of each of the plurality of frames for color reduction moving image production;
> combining the color reduction moving image frame to produce the color reduction moving image; and
> wherein, when the model type of the transmission request terminal device is a model type, which cannot display the moving image but can display a color reduction moving image, converting the requested moving image to the color reduction moving image, and sending the color reduction moving image to the transmission request terminal device instead of the moving image, and
> wherein the color reduction processing increases the degree of diffusing the error to the corresponding pixel position in the temporally consecutive next frame for color reduction moving image production, when the number of the plurality of frames for color reduction moving image production per unit time is larger.

* * * * *